(12) United States Patent
Aquilla et al.

(10) Patent No.: US 10,839,409 B1
(45) Date of Patent: Nov. 17, 2020

(54) AUGMENTED REALITY STORE AND SERVICES ORIENTATION GAMIFICATION

(71) Applicant: Wells Fargo Bank, N.A., San Francisco, CA (US)

(72) Inventors: Christin Holt Aquilla, Poolesville, MD (US); Kourtney Eidam, Sunnyside, NY (US)

(73) Assignee: Wells Fargo Bank, N.A., San Francisco, CA (US)

(*) Notice: Subject to any disclaimer, the term of this patent is extended or adjusted under 35 U.S.C. 154(b) by 890 days.

(21) Appl. No.: 14/265,604

(22) Filed: Apr. 30, 2014

(51) Int. Cl.
*H04N 7/18* (2006.01)
*G06Q 30/02* (2012.01)
*G06T 19/00* (2011.01)

(52) U.S. Cl.
CPC ....... *G06Q 30/0209* (2013.01); *G06T 19/006* (2013.01)

(58) Field of Classification Search
CPC ....................................................... H04N 7/18
USPC ............................................................ 705/14
See application file for complete search history.

(56) References Cited

U.S. PATENT DOCUMENTS

| | | | |
|---|---|---|---|
| 6,641,037 B2 | 11/2003 | Williams | |
| 8,282,491 B2 | 10/2012 | Auterio et al. | |
| 8,407,086 B2 | 3/2013 | Kusumoto et al. | |
| 8,438,110 B2 | 5/2013 | Calman et al. | |
| 8,786,399 B2 * | 7/2014 | Skourup | G05B 23/0267 340/3.7 |
| 10,395,292 B1 | 8/2019 | Graham | |
| 2003/0158796 A1 | 8/2003 | Balent | |
| 2008/0226119 A1 | 9/2008 | Candelore | |
| 2008/0279481 A1 | 11/2008 | Ando | |
| 2009/0063307 A1 | 3/2009 | Groenovelt | |
| 2009/0128335 A1 | 5/2009 | Leung | |
| 2010/0016080 A1 | 1/2010 | Garden et al. | |
| 2010/0046842 A1 | 2/2010 | Conwell | |
| 2010/0048290 A1 | 2/2010 | Baseley et al. | |
| 2011/0029364 A1 * | 2/2011 | Roeding | G06Q 30/00 705/14.16 |
| 2011/0124390 A1 | 5/2011 | Wilen | |
| 2011/0213664 A1 | 9/2011 | Osterhout et al. | |
| 2011/0221657 A1 | 9/2011 | Haddick | |
| 2011/0258049 A1 * | 10/2011 | Ramer | G06F 17/30867 705/14.66 |
| 2012/0122554 A1 | 5/2012 | Paquet et al. | |
| 2012/0183172 A1 | 7/2012 | Stroila | |
| 2012/0191518 A1 | 7/2012 | Nix et al. | |

(Continued)

OTHER PUBLICATIONS

Virtual Simulation and Augmented Interfaces for Business Models with Focus on Banking and Retail, Biju Shoolapani ; Parthasarathi Jink 2012, IEEE (Year: 2012).*

(Continued)

*Primary Examiner* — Abhishek Vyas
*Assistant Examiner* — Darnell A Pouncil
(74) *Attorney, Agent, or Firm* — Merchant & Gould P.C.

(57) ABSTRACT

A method implemented on an electronic computing device includes identifying a user of an augmented reality (AR) device. Profile information is obtained for the user based on the identity of the user. An interactive game is activated on the AR device. The interactive game is tailored to the user based on the profile information. One or more rewards are provided to the user for implementing aspects of the interactive game.

10 Claims, 6 Drawing Sheets

(56) References Cited

U.S. PATENT DOCUMENTS

| | | |
|---|---|---|
| 2012/0212400 A1 | 8/2012 | Border et al. |
| 2012/0231424 A1 | 9/2012 | Calman et al. |
| 2012/0231814 A1 | 9/2012 | Calman et al. |
| 2012/0232937 A1 | 9/2012 | Calman et al. |
| 2012/0232954 A1* | 9/2012 | Calman ............ G06Q 30/0625 705/7.32 |
| 2012/0232966 A1 | 9/2012 | Calman et al. |
| 2012/0232968 A1 | 9/2012 | Calman et al. |
| 2012/0232976 A1 | 9/2012 | Calman et al. |
| 2012/0232977 A1 | 9/2012 | Calman et al. |
| 2012/0233015 A1 | 9/2012 | Calman et al. |
| 2012/0233032 A1* | 9/2012 | Calman ............... G06Q 30/02 705/27.1 |
| 2012/0233072 A1 | 9/2012 | Calman et al. |
| 2012/0256954 A1* | 10/2012 | Soon-Shiong ...... G06F 17/3087 345/633 |
| 2012/0290366 A1 | 11/2012 | Giles |
| 2013/0033522 A1 | 2/2013 | Calman et al. |
| 2013/0051548 A1* | 2/2013 | Chavez ............... G06Q 10/101 379/265.09 |
| 2013/0170697 A1 | 7/2013 | Zises |
| 2013/0179303 A1 | 7/2013 | Petrou |
| 2013/0191250 A1 | 7/2013 | Bradley et al. |
| 2013/0197992 A1 | 8/2013 | Bao |
| 2013/0210523 A1 | 8/2013 | Arumugam et al. |
| 2013/0218886 A1 | 8/2013 | Graham et al. |
| 2013/0238413 A1 | 9/2013 | Carlson et al. |
| 2013/0278631 A1 | 10/2013 | Border et al. |
| 2013/0281208 A1 | 10/2013 | Lyons et al. |
| 2013/0290106 A1 | 10/2013 | Bradley et al. |
| 2014/0028712 A1 | 1/2014 | Keating et al. |
| 2014/0100996 A1 | 4/2014 | Klein |
| 2014/0100997 A1 | 4/2014 | Mayerle et al. |
| 2014/0143105 A1 | 5/2014 | Shaw et al. |
| 2014/0152847 A1 | 6/2014 | Zomet |
| 2016/0295038 A1* | 10/2016 | Rao ........................ G06F 3/005 |

OTHER PUBLICATIONS

U.S. Appl. No. 14/265,620, filed Apr. 30, 2014 entitled "Augmented Reality Shopping Rewards".

U.S. Appl. No. 15/388,343, filed Dec. 22, 2016 entitled "Augmented Reality Shopping Rewards".

Johnson, "Kellogg differentiates augmented reality efforts with entertainment," http://www.mobilemarketer.com/cms/news/software-technology/16473.html, Mobile Marketer, Oct. 28, 2013, 4 pages.

Rohs, "Marker-Based Embodied Interaction for Handheld Augmented Reality Games," http://citeseerx.ist.psu.edu/viewdoc/summary?doi=10.1.1.83.630, 2006, CiteSeerXβ Journal of Virtual Reality and Broadcasting, 1 page.

Fiorletta, "IBM Unveils Augmented Reality Mobile Shopping App for In-Store Engagement," http://www.retailtouchpoints.com/mobile/1737-ibm-unveils-augmented-reality-mobile-sho>, retail TouchPoints, Jul. 20, 2012, 7 pages.

Greengard, "Retail Turns to Tech to Transform the In-Store Experience," <URL: http://eu.cmo.com/content/cmo-eu/home/articles/2013/9/23/retail_turns_to_tech.print.html>, CMO, Oct. 8, 2013, 5 pages.

Langley, "Food retail apps and innovative loyalty software platform launched in Australia," http://ausfoodnews.com.au/2013/10/23/food-retail-apps-and-innovative-loyalty-software-platform-launched-in-australia.html, AFN Thought for Food, Oct. 23, 2013, 3 pages.

Langlotz, Tobias, et al. "Next-generation augmented reality browsers: rich, seamless, and adaptive." Proceedings of the IEEE 102.2 (2014), pp. 155-169 (Feb. 2014).

* cited by examiner

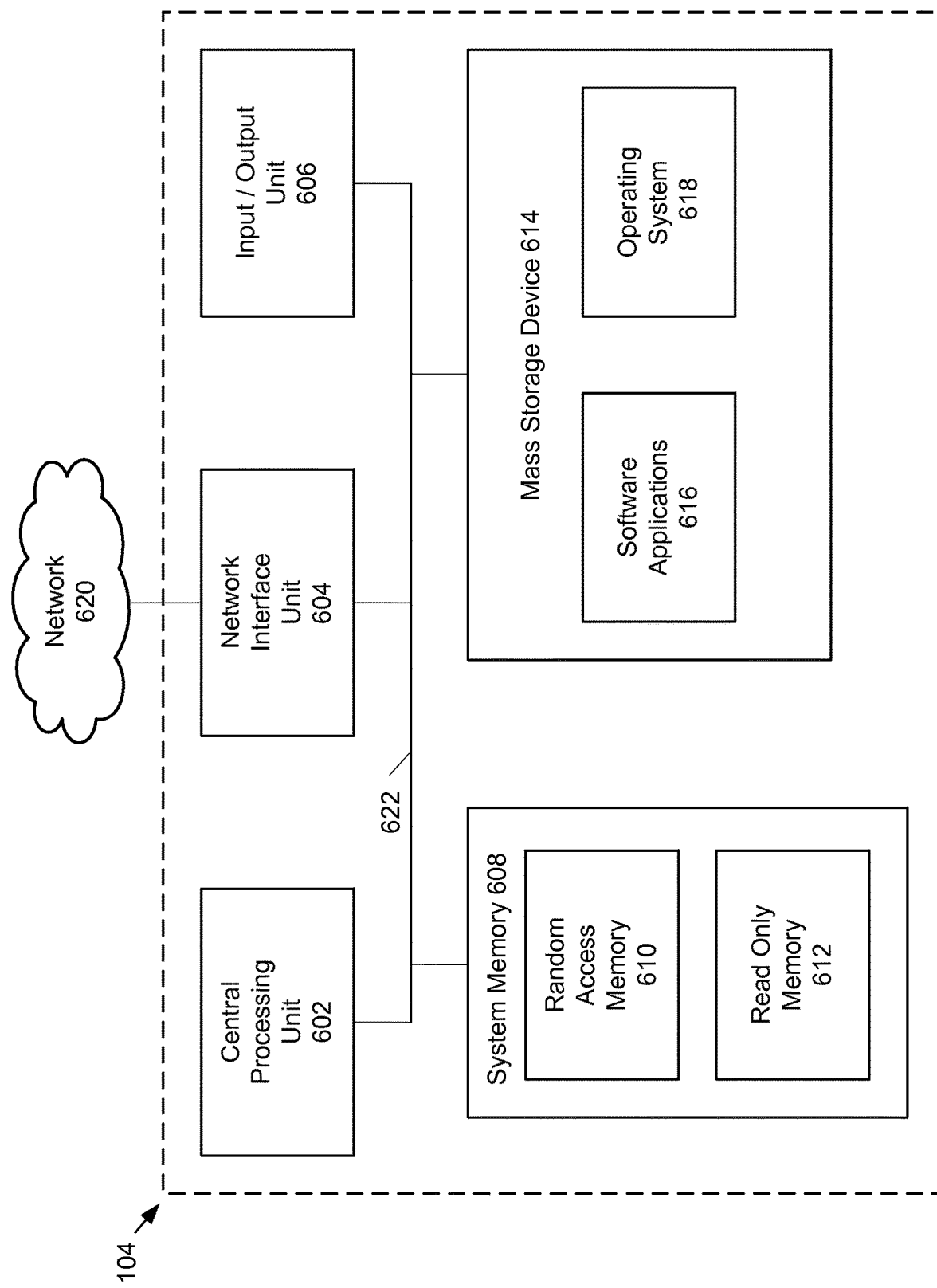

AUGMENTED REALITY STORE AND SERVICES ORIENTATION GAMIFICATION

BACKGROUND

Augmented reality is a technology in which a person's conception of reality can be enhanced, typically through augmented sound, video or graphics displays. The augmentation is typically implemented via various technologies, such as a headset that may be worn by the person. One or more augmented views may be presented to the person through the headset.

The augmented reality headset typically includes a wearable computer and an optical display mounted to the headset. The wearable computer may include a wireless telecommunication capability, permitting a wireless connection from the wearable computer to a server computer. Because of the wireless telecommunication capability, the augmented reality headset may be used to interact with the server computer to accomplish various tasks.

SUMMARY

Embodiments of the disclosure are directed to a method implemented on an electronic computing device. The method comprises: identifying a user of an augmented reality (AR) device; obtaining profile information for the user based on the identity of the user; activating an interactive game on the AR device, the interactive game being tailored to the user based on the profile information; and providing one or more rewards to the user for implementing aspects of the interactive game.

In another aspect, a method implemented on an augmented reality electronic device comprises: viewing signage in a financial institution or retail store with the AR device; as a result of viewing the signage, establishing a wireless connection with a server computer; receiving an interactive game from the server computer, the interactive game providing information regarding products and services of the financial institution or retail store, the interactive game being tailored to a profile of a user of the AR device; and activating the interactive game on the AR device.

In yet another aspect, a server computer comprises: a processing unit; and system memory, the system memory including instructions which, when executed by the processing unit, cause the server computer to: identify a user of an augmented reality (AR) device, the AR device being a headset comprising a wearable computer with a camera and an optical head-mounted display; obtain profile information for the user based on the identity of the user, the profile information including information regarding a history for the user of banking products purchased and banking services used; activate an interactive game on the AR device, the interactive game being tailored to the user based on the profile information, the interactive game including one or more videos to be displayed on the AR device; and provide one or more rewards to the user for implementing aspects of the interactive game, the rewards being tailored to a geographical location of the user based on global positioning information received from the AR device.

The details of one or more techniques are set forth in the accompanying drawings and the description below. Other features, objects, and advantages of these techniques will be apparent from the description, drawings, and claims.

DESCRIPTION OF THE DRAWINGS

FIG. 6 shows example physical components of the server computer of FIG. 1.

DETAILED DESCRIPTION

Figure 1:
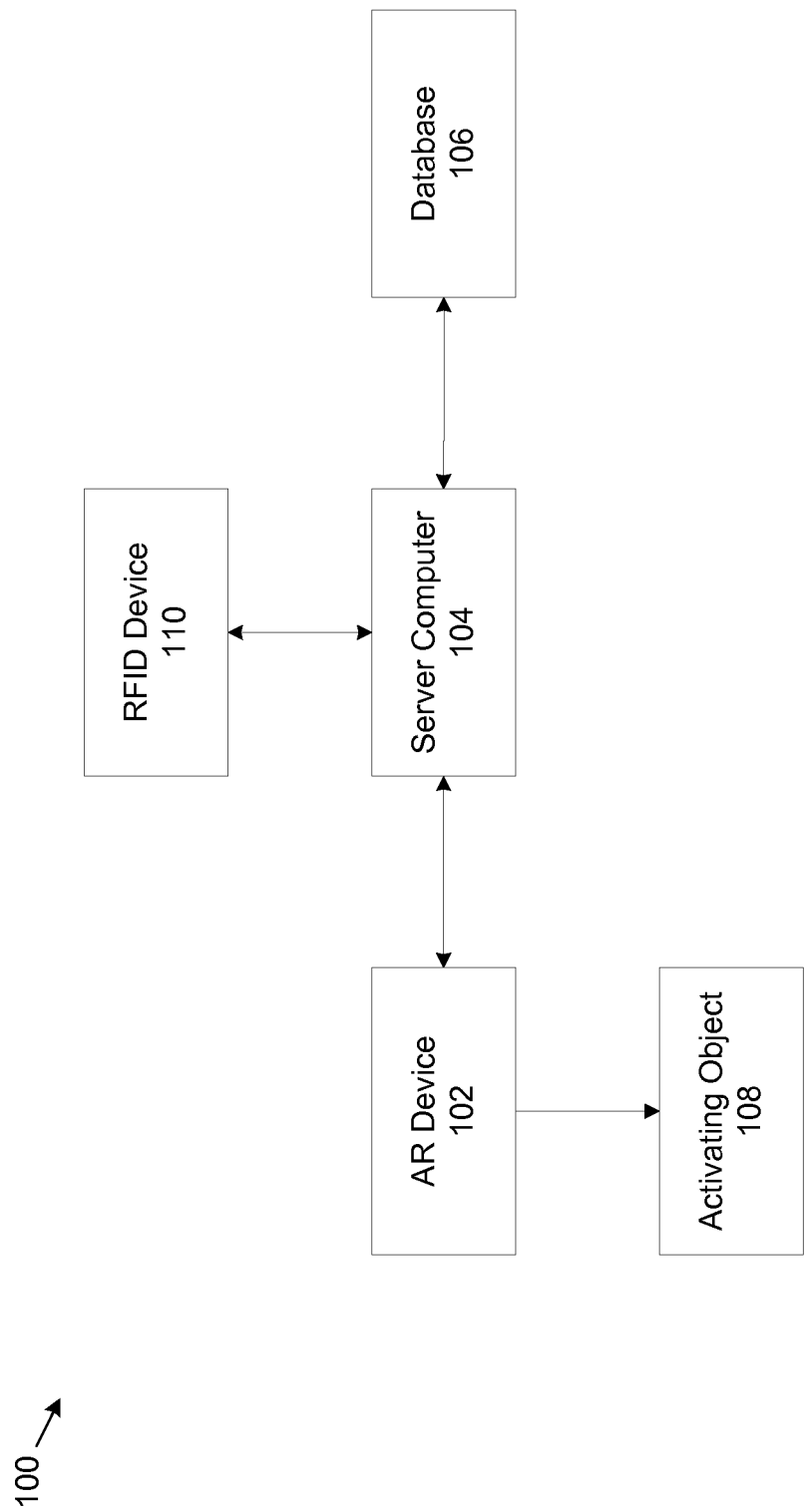
FIG. 1 shows an example system that may be used for augmented reality (AR) store and services orientation gamification.

The present disclosure is directed to systems and methods for using augmented reality (AR) enabled gamification to engage customers of a financial institution or a retail store to learn more about products and services offered by the financial institution or retail store. Documents, advertisements and signage in the financial institution or retail store may be scanned by an AR device to launch interactive content that, once reviewed, may give the customer a reward, such as points or coins. The interactive content may be specifically tailored to a customer to provide information on products and services for which the customer may be interested. In this disclosure, the systems and methods are described for a bank. However, the systems and methods may also be applied to other financial institutions or retail stores. In addition, the systems and method may be used to view interactive content during a tour of a bank museum or other museum.

Gamification as used in this disclosure refers to an interactive session between a user of an AR device and a server computer in which rewards are offered to the user for completing specific activities related to products and services offered by the financial institution or retail store. Both the rewards and the specific activities are tailored to a profile of the user. The profile is based on an identity of the user and includes such items as a history of previous purchases and uses of the products and services. The specific activities may include activities such as watching a video, filling out a form, meeting with a bank employee such as a teller or a loan officer, choosing to use a specific bank service such as bill pay or paperless statements and taking a quiz at the end of a video. Other aspects of the profile of the user and other activities are possible. Gamification may also include game like features such as responding to clues and getting reward points if a correct response is made or an activity is performed as a result of a clue.

The systems and methods are generally described for an AR device that may be worn or carried by a user. An example of and AR device that may be worn by the user is an AR headset. An example of an AR device that may be carried by the user is a smartphone or tablet computer that includes AR components such as a processor, display and camera and an AR software application.

The AR headset includes a wearable computer, a camera and an optical display. The wearable computer includes a wireless telecommunication capability, permitting a wireless connection between the wearable computer and one or more server computers. The wearable computer also includes voice recognition capability, permitting the user to direct the wearable computer via voice commands. In addition, in some implementations, the wearable computer also includes biometric capability such as facial recognition, retinal scan capability, finger print and voice print capability.

One type of AR headset described in this disclosure is a smart glass type of headset, similar to eyeglasses, which may be worn by the user. The user may view AR images in the glass portion of the headset. An example of a smart glass headset is Google Glass, from Google Inc. of Mountain View, Calif.

In an example scenario involving AR-enabled gamification, when a customer or potential customer walks into the bank, the customer is identified, as explained later herein. The customer may be wearing an AR headset or the customer may possess another AR device such as an AR-enabled smartphone or tablet computer. While in the bank, the customer may go up to an object in the bank from which an interactive game may be activated via the AR device. For example, the customer may view an advertisement or signage in the bank or the customer may view a document that may include information about the interactive game.

When the customer views the object with the AR headset, the customer looks at the object using the AR headset. When the customer views the object with the AR-enabled smartphone or tablet computer, the customer uses the camera in the AR-enabled smartphone or tablet computer to view the object.

Viewing the object with the AR-enabled device may initiate the interactive game. In some implementations, the object may include a quick response (QR) code. In other implementations the AR-enabled device may be configured to recognize certain language or imagery in the object and initiate the interactive game based on viewing this language or imagery. Initiating the interactive game is discussed in more detail later herein.

When the customer has an account with the bank, the customer may be directed via the interactive game to perform an activity pertinent to the customer. For example, because the identity of the customer is known, the customer may be directed to watch a video describing available home mortgage options or other banking products to which the customer may be interested. However, when it is known from the customer's banking history that the customer would not likely be interested in a mortgage, because for example, the customer has recently obtained a mortgage, the video may be based on something else, specifically tailored to the customer.

When participating in the interactive game, customers may be permitted to opt-in to additional services, for example to sign up for bill pay, to schedule appointments, for example to schedule an appointment with a loan officer and to perform other activities such as filling out an application for a loan or a mortgage.

In order to induce the customer to perform a specific activity, the interactive game may indicate to the customer that a reward may be obtained for performing the specific activity. Rewards may include such items as banking merchandise, virtual coins or reward points. Other rewards are possible.

When the customer does not have an account with the bank and the customer views the object with the AR-enabled device, the customer may be directed to a website from which the customer can download a bank software application. The customer may apply for a bank account using the software application. As an inducement for downloading the bank software application and for opening a new account, the customer may be offered a reward, such as banking merchandise, virtual coins, reward points, or something else.

Rewards may be cashed in for merchandise or for entertainment such as movies and baseball games. In addition, rewards may be applied to other reward programs, for example to obtain double rewards. Rewards may also be tailored to a specific customer. For example, because the identity of the customer is known, the customer may be offered services and products in which, based on a customer profile and history, the customer may be interested.

The AR-enabled device includes a financial software application that supports gamification. The software application may synchronize with bank gift stores and reward programs in real-time to register and track rewards awarded to the customer during the interactive game.

In some implementations the AR-enabled gamification may be implemented via a simulated reality facility, similar to a holodeck. The simulated reality facility is configured to generate an augmented reality scene. Using the simulated reality facility the customer may perform specific activities such as taking a virtual tour of a banking facility, watching videos describing banking products, trying out new banking services, etc. The simulated reality facility may be implemented in various locations, such as in a bank or in the customer's home. For example, the bank may have a special room with equipment that may support the simulated reality facility. In addition, the customer may own or have access to equipment that may support the simulated reality facility.

FIG. 1 shows an example system 100 that supports AR-enabled gamification. The example system 100 includes an AR device 102, a server computer 104, a database 106, an activating object 108 and a radio frequency identification (RFID) device.

AR device 102 may be an AR headset device, such as Google Glass or a smartphone or tablet computer with an AR software application. The AR device 102 may be used to initiate the interactive game and also to display information relating to the interactive game. For example messages, videos and other information related to the interactive game may be viewed on AR device 102.

Server computer 104 is a server computer associated with the bank. A wireless connection may be established between AR device 102 and server computer 104. Server computer 104 includes or has access to a history and profile for the customer. When the interactive game is initiated, a software application on server computer 104 determines a content of information to be displayed on AR device 102. The content is tailored to an identity of the customer. The content may include such things as a particular video to be displayed on AR device 102, a particular direction, such as a suggestion to see a particular bank employee, and/or particular rewards that may be tailored to the customer. Other content is possible. The server computer 104 may actually be one or a plurality of server computers, located individually or on one or more server farms.

In some implementations, one or more of the history and profile for the customer and the content of one or more interactive games may be stored on database 106. In other implementations, the history, profile and content may be stored on server computer 104. When stored on database 106, the history, profile and content are accessible over a network to server computer 104. The network may be an internal network or it may be the Internet.

Activating object 108 is an object in the bank from which the interactive game may be initiated via AR device 102. As discussed, in some implementations the activating object may be signage, such as a wall poster, advertisements or documents. Other activating objects are possible. In some implementations the interactive game may be initiated by viewing a QR code on activating object 108 with AR device 102. In other implementations, AR device may be configured to initiate the interactive game when viewing specific words, phrases, pictures or symbols on activating object 108.

As discussed, when the interactive game is initiated, a directive may be displayed on AR device 102 for the customer to see a bank employee, for example a loan officer. In typical implementations, many bank employees wear a security badge having an RFID device 110. RFID device 110 is used to locate the bank employee, if the bank employee is in the bank. RFID device 110 may include a unique identifier that corresponds to an identification number of the bank employee.

In an example implementation, when a bank employee is to be located, server computer 104 initiates a scan of the bank. As a result of the scan, RFID devices in the bank respond with their unique identifiers. In addition, based on a direction and a time for a response to the scan, server computer 104 determines where the bank employee is located. In some implementations, the position of the bank employee is displayed on a display screen of AR device 102.

Figure 2:
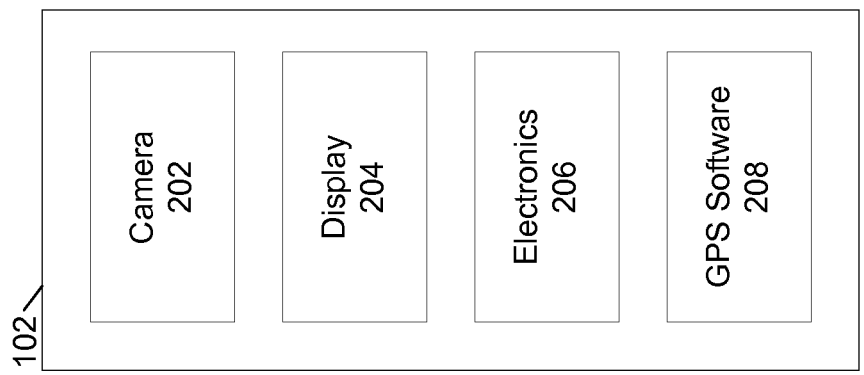
FIG. 2 shows example modules of the AR device of FIG. 1.

FIG. 2 shows example modules 200 of AR device 102. The example modules 200 include a camera 202, a display 204, electronics 206 and GPS software 208. The camera 202 is a camera that is built-in to AR device 102. Display 204 is a display that is also built-in to AR device 102. Electronics 206 includes an electronic computing device with wireless capability. The wireless capability may include Bluetooth, radio frequency identification (RFID), mobile telecommunications, Wi-Fi, or similar types of wireless capability. GPS software 208 is typically a software application that may be installed on the mobile electronic device. When AR device 102 is an AR headset, camera 202, display, 204, electronics 206 and GPS software 208 are part of the AR headset.

Figure 3:
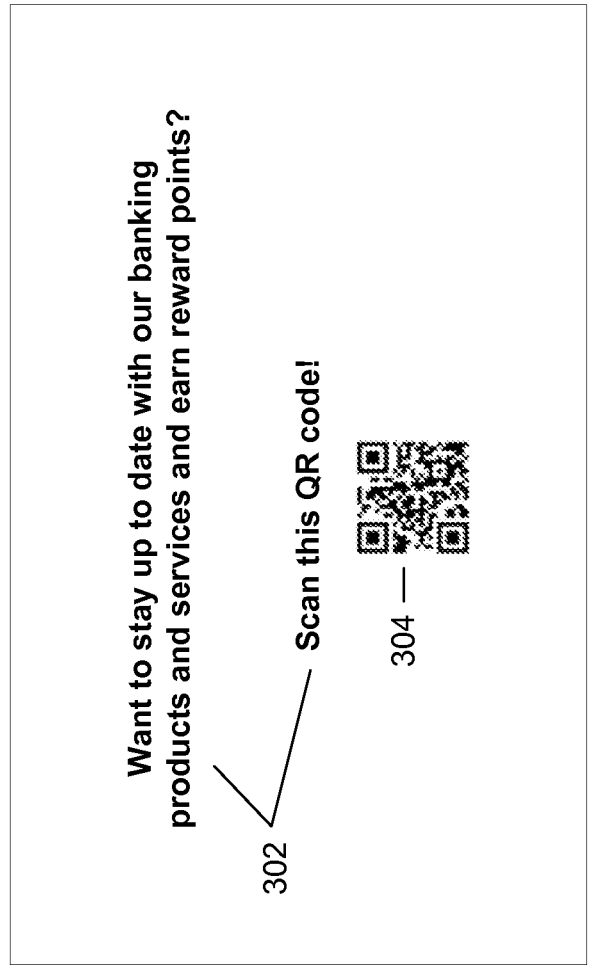
FIG. 3 shows an example user interface of the activating object of FIG. 1.

FIG. 3 shows an example activating object 108. In this example, activating object 108 is signage, for example a wall poster, in the bank. The poster includes text 302 inquiring of a person whether the person wants to learn more about the bank's products and services and offering a reward if the person agrees. The text 302 also instructs the person to scan QR code 304.

When the person scans QR code 304 and the person is an existing bank customer, information tailored to the person is displayed on AR device 102. The information is based on an identity and customer profile of the customer. The information may be in the form of a video, text, photos or a directive for the person to see a bank employee. Other types of information may be displayed to the customer.

When the person scans QR code 304 and the person is not an existing bank customer, different type of information may be displayed to the customer. For example, the person may be asked to view a video providing an overview of products and services offered by the bank. The information may also include a link for the person to download a financial software application offered by the bank. The financial software application may be downloaded and installed on the person's smartphone or tablet computer.

As stated earlier herein, the gamification discussed is specifically tailored to a person, either a customer or a potential customer. When the person is a customer, the gamification is based on a profile and history of the customer. When the person is not a customer, the gamification is oriented toward introducing the bank's products and services to the person to encourage the person to become a customer.

In order to tailor the gamification to the person, either the customer or potential customer, an identity of the person needs to be determined. Using the systems and methods of this disclosure, the identity of the person may be determined by one of several methods.

In one method, when the person is wearing an AR headset, the AR headset may synchronize with a computer system in the bank, for example with server computer 104. One way in which the AR headset may synchronize with the computer system in the bank is via a Wi-Fi connection.

In some implementations, when the person enters the bank and the bank has a Wi-Fi system, a notification may be displayed on the AR headset indicating that a Wi-Fi connection is available. When the customer accepts the connection, either via a voice command or via touching a selection area on the AR headset, a wireless connection is made between the AR headset and a server computer in the bank, for example server computer 104. Once the wireless connection is made, the person may be prompted for identification information. Example identification information may include a bank account number, a unique identifier for the person, a login and password or other types of information.

In other implementations, the person may initiate a wireless connection to server computer 104 when viewing signage in the bank. For example, the signage may include a URL for the bank that the person can access to establish the wireless connection. Once the wireless connection is established, the person may send identification information to server computer 104 over the wireless connection.

Another way in which the AR headset may synchronize with the computer system in the bank is via a near-field communication (NFC) or similar type of connection. The AR headset typically includes support for NFC. When two NFC compatible devices are close to each other, a communication session may be established between the two devices. When one of the two devices is a device that may be connected to or in communication with server computer 104, when the communication session is established identification information from AR device 102 may be transmitted to server computer 104. For example, the person with AR device 102 may walk up to an automated teller machine (ATM). The ATM may include an NFC compatible device, such that when AR device 102 comes into close contact with the ATM, the communication session is established. Once the communication session is established, identification information from AR device 102 may be sent to server computer 104.

In a second method, facial recognition may be used to identify the person wearing the AR headset. In this second method, a camera in the bank may take a photo of the person as the person enters the bank. For example, the camera may be one of several security cameras in the bank. The photo may be sent to server computer 104 or another server computer that includes facial recognition software. The facial recognition software may compare the photo with images of bank customers, determine whether with the person with AR device 102 is a bank customer, and if so, identify the customer.

In a third method, the person may be instructed to log in to a server computer using a terminal or other log-in device in the bank. For example, the person may be prompted to log in via a message on AR device 102 when the person establishes the communication session with server computer 104. The identity of the person is obtained from the login.

In addition to the gamification being uniquely tailored to the customer, the gamification may also be uniquely tailored to a geographical location of the customer. AR device 102 and other similar AR devices typically include global positioning system (GPS) software by which the geographical location of the AR device can be determined. For example, if AR device 102 is determined to be in a southern location, for example Florida, a video showing homes in Florida may be shown to the customer as part of the game. Similarly, if AR device 102 is determined to be in a northern location, for example Minnesota, a video showing homes having a Minnesota style may be shown to the customer as part of the game. The geographical location of the customer may also be determined based on contextual images received from the camera on the AR device. For example, the geographical location of the customer may be determined based on buildings, landmarks, signage, logos or other contextual information received by the AR device camera.

Using the GPS system, rewards offered as part of the game may also be tailored by geographic location. For example, one reward offered to a customer in Florida may be tickets to a Tampa Bay Rays baseball game, whereas one reward offered to a customer in Minnesota may be tickets to a Minnesota Twins baseball game.

Figure 4:
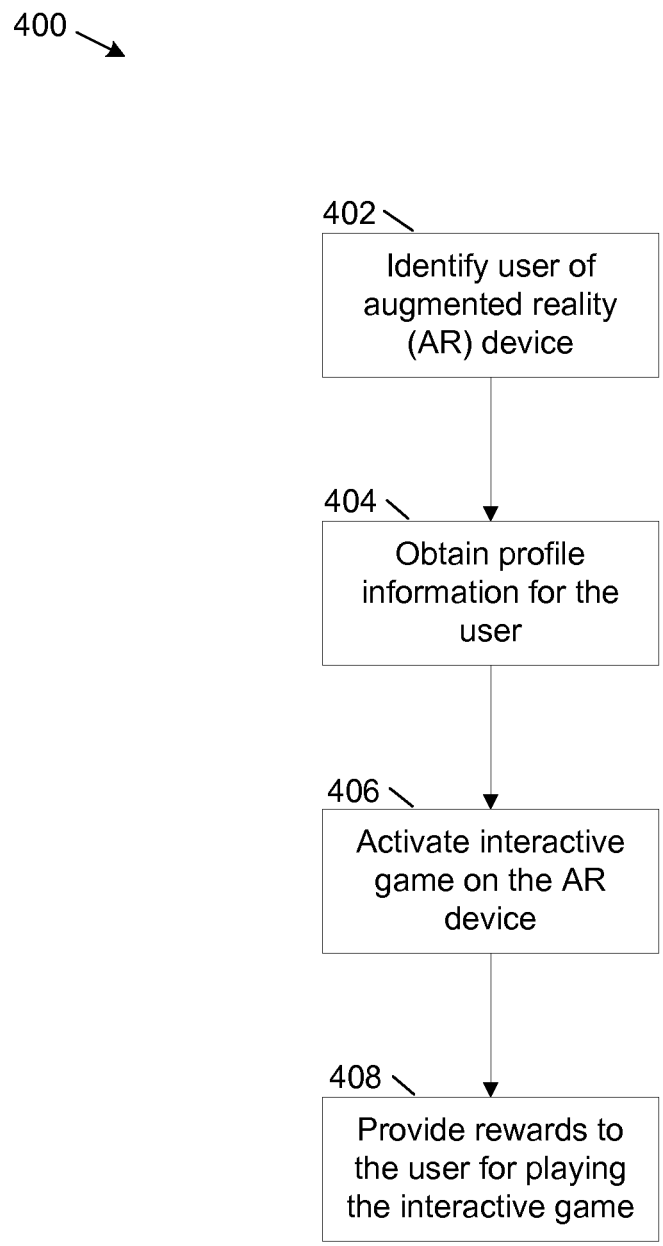
FIG. 4 shows a flowchart for an example method implemented on the server computer of FIG. 1 for activating an interactive game on the AR device of FIG. 1.

FIG. 4 shows a flowchart of a method 400 implemented on a server computer for activating an interactive game on an AR device, for example AR device 102. The method 400 is typically implemented in a financial institution such as a bank or in a retail store. For method 400, the AR device is an AR headset, such as Google Glass. In other methods, the AR device may be a smartphone or tablet computer having an AR software application.

At operation 402, a user of the AR device is identified. The user may be identified when the user enters the bank or retail store. One way in which the user may be identified, is by synchronizing the user's AR device with a software application of a computer system, for example server computer 104, at the bank or retail store. In some implementations, messages may be broadcast from server computer 104 that may be intercepted by AR device 102 and may cause AR device 102 to establish a wireless connection with server computer 104. When the wireless connection is established, identification information for the user may be sent from AR device 102 to server computer 104.

At operation 404, when a determination is made that the user is a customer of the bank or retail store, a profile for the customer is obtained based on the identity of the customer. The profile may include such things as the customer's purchasing history, products or services that the customer has purchased or used, and videos related to products and services offered by the bank or retail store that were previously viewed by the customer.

At operation 406, an interactive game is activated on AR device 102. The interactive game is sent from server computer 104 to AR device 102 via the wireless connection. The interactive game is designed to introduce the customer to products and services that the customer of which the customer may not be aware or may not be using. For example, for a customer of a bank, the interactive game may promote such banking services as bill pay and paperless billing. The interactive game is designed to obtain input from the customer and to provide videos and other information to AR device 102 based on the input. For example, if the customer indicates that he/she is interested in bill pay, a video on bill pay may be played on AR device 102. As another example, if the customer indicates he/she is interested in a loan, server computer 104 may send information to AR device 102 regarding a name and location of a loan officer in the bank.

At operation 408, the customer receives rewards for playing the interactive game. For example, the customer may receive a reward for watching a video, for talking to a loan officer and for filling out a loan application. The rewards may include such items as merchandise, cash, virtual coins and reward points. The virtual coins and reward points may be accumulated and redeemed for merchandise or cash. Other types of rewards are possible.

Figure 5:
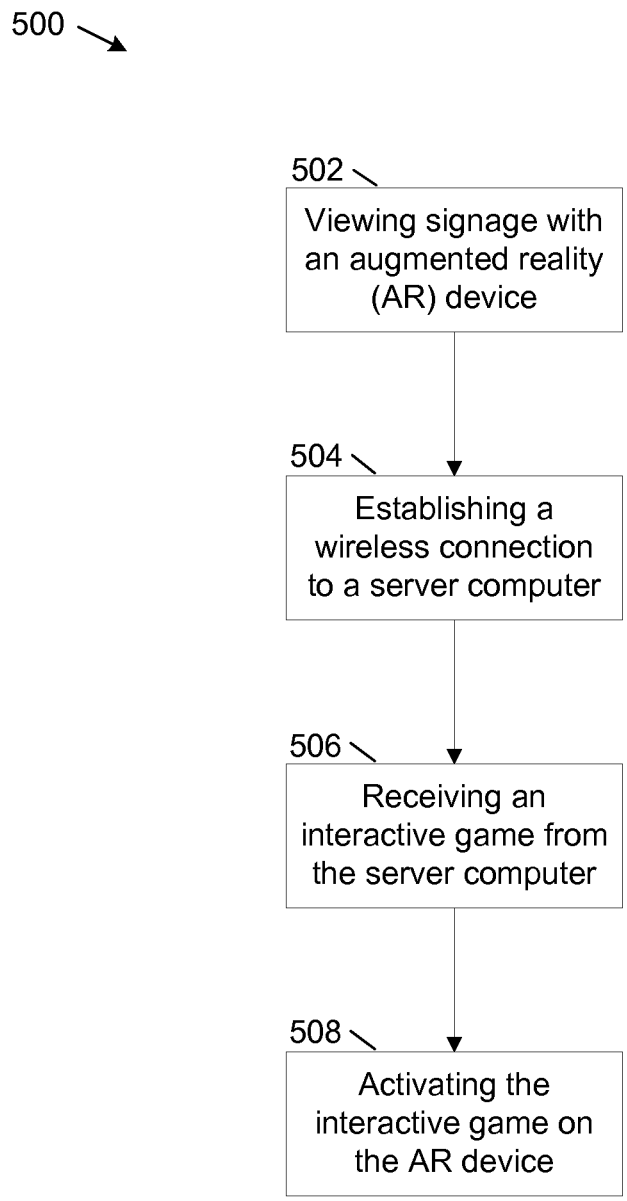
FIG. 5 shows a flowchart for an example method implemented on the AR device of FIG. 1 for activating an interactive game on the AR device of FIG. 1.

FIG. 5 shows a flowchart of a method 500 implemented on an AR device, for example on AR device 102, for activating an interactive game on AR device 102.

At operation 502, a customer of a bank or retail store may use AR device 102 to view signage in the bank or retail store. The signage may be an item such as a wall poster or an advertisement. In some implementations, the signage may be displayed on a display screen of an ATM. The signage may include words, phrases or imagery that are recognized by a software application on AR device 102. The signage may also include a QR code.

At operation 504, a wireless connection is established between AR device 102 and a server computer, for example server computer 104. The wireless connection is established when the words, phrases, imagery or QR code are recognized by the software application.

At operation 506, an interactive game is received at AR device 102 from server computer 104. The interactive game is oriented to the customer and is based on a profile of the customer.

At operation 508, the interactive game is activated on AR device 102.

As illustrated in the example of FIG. 6, the server computer 104 includes at least one central processing unit ("CPU") 602, a system memory 608, and a system bus 622 that couples the system memory 608 to the CPU 602. The system memory 908 includes a random access memory ("RAM") 610 and a read-only memory ("ROM") 612. A basic input/output system that contains the basic routines that help to transfer information between elements within the server computer 104, such as during startup, is stored in the ROM 612. The server computer 104 further includes a mass storage device 614. The mass storage device 614 is able to store software instructions and data. A central processing unit, system memory and mass storage device similar to that in FIG. 6 are also included in AR device 102.

The mass storage device 614 is connected to the CPU 602 through a mass storage controller (not shown) connected to the system bus 622. The mass storage device 614 and its associated computer-readable data storage media provide non-volatile, non-transitory storage for the server computer 104. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the server computer 104.

According to various embodiments of the invention, the server computer 104 may operate in a networked environment using logical connections to remote network devices through the network 620, such as a wireless network, the Internet, or another type of network. The server computer 104 may connect to the network 620 through a network interface unit 604 connected to the system bus 622. It should be appreciated that the network interface unit 604 may also be utilized to connect to other types of networks and remote computing systems. The server computer 104 also includes an input/output controller 606 for receiving and processing input from a number of other devices, including a touch user interface display screen, or another type of input device. Similarly, the input/output controller 606 may provide output to a touch user interface display screen or other type of output device.

As mentioned briefly above, the mass storage device 614 and the RAM 610 of the server computer 104 can store software instructions and data. The software instructions include an operating system 618 suitable for controlling the operation of the server computer 104. The mass storage device 614 and/or the RAM 610 also store software instructions, that when executed by the CPU 602, cause the server computer 104 to provide the functionality of the server computer 104 discussed in this document. For example, the mass storage device 614 and/or the RAM 610 can store software instructions that, when executed by the CPU 602, cause the server computer 104 to display received financial data on the display screen of the server computer 104.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A method implemented on an electronic computing device, the method comprising:
   using an augmented reality (AR) device to identify a user of the AR device;
   obtaining profile information for the user based on the identity of the user;
   determining, using the AR device, whether the user is a customer of a financial institution;
   activating an interactive game on the AR device in response to a viewing of an activating object, the activated interactive game being tailored to the user based on the profile information, the activated interactive game being selected from first and second interactive games based on the determining whether the user is a customer of the financial institution, the first interactive game being configured to introduce banking products and services of the financial institution to the user when the user is determined not to be a customer of the financial institution;
   displaying the activated interactive game on the AR device;
   when the user is determined to be a customer of the financial institution, the activated interactive game is the second interactive game, and providing, to the user during the activated interactive game, information regarding financial services and products the user is known not to have, wherein the activated interactive game provides the information regarding the financial services and products in an augmented reality environment and allows the user to interact with the information;
   during the activated interactive game, displaying on the AR device a directive for the user to see an employee of the financial institution for help with the financial services and products;
   initiating a scan of a physical location of the financial institution;
   in response to the scan, determining a location and a name of the employee at the financial institution;
   displaying on the AR device the location and the name of the employee at the financial institution;
   providing one or more rewards to the user as a result of the user completing specific activities related to the financial services and products as part of the activated interactive game; and
   allowing the user to apply the one or more rewards to a reward program associated with the financial services and products.

2. The method of claim 1, wherein the AR device is a headset comprising a wearable computer with a camera and an optical head-mounted display.

3. The method of claim 1, wherein the AR device is a smartphone.

4. The method of claim 1, further comprising playing one or more videos on the AR device, the one or more videos being related to banking services and products.

5. The method of claim 1, further comprising receiving one or more inputs from the user regarding banking services and products in which the user has an interest.

6. The method of claim 5, further comprising scheduling one or more appointments for the user with one or more bank employees based on the one or more inputs from the user.

7. The method of claim 1, wherein the rewards are tailored to a geographical location of the user based on global positioning information received from the AR device.

8. The method of claim 1, wherein the activating object comprises one of signage, an advertisement and a document.

9. The method of claim 8, wherein viewing signage comprises viewing a quick response (QR) code.

10. A server computer comprising:
    a processing unit; and
    system memory, the system memory including instructions which, when executed by the processing unit, cause the server computer to:
    use an augmented reality (AR) device to identify a user of the AR device, the AR device being a headset comprising a wearable computer with a camera and an optical head-mounted display;
    obtain profile information for the user based on the identity of the user, the profile information including information regarding a history for the user of banking products purchased and banking services used;
    determine, using the AR device, whether the user is a customer of a financial institution;
    activate an interactive game on the AR device in response to a viewing of an activating object, the activated interactive game being tailored to the user based on the profile information, the activated interactive game being selected from first and second interactive games based on the determining whether the user is a customer of the financial institution, the first interactive game being configured to introduce banking products and services of the financial institution to the user when the user is determined not to be a customer of the financial institution;
    display the activated interactive game on the AR device, the interactive game being tailored to the user based on a geographical location of the user based on global positioning information received from the AR device, the interactive game including one or more videos to be displayed on the AR device;

when the user is determined to be a customer of the financial institution, the activated interactive game is the second activated interactive game, and during the activated interactive game, provide to the user information regarding financial services and products the user is not known to have and display on the AR device a directive for the user to see an employee of a bank for help with the banking products and banking services;

during the activated interactive game, initiate a radio frequency scan of the financial institution;

in response to the radio frequency scan, receive from the employee a unique identifier of the employee;

during the activated interactive game, display on the AR device, a location of the employee at the bank; and provide one or more rewards to the user as a result of the user completing specific activities related to financial services and products as part of the activated interactive game, the rewards being tailored to the geographical location of the user.

* * * * *